United States Patent [19]

Riedel

[11] 4,407,270

[45] Oct. 4, 1983

[54] SOLAR COLLECTOR

[76] Inventor: Kenneth A. Riedel, 1601 W. Salem, Indianola, Iowa 50125

[21] Appl. No.: 270,222

[22] Filed: Jun. 4, 1981

[51] Int. Cl.³ .............................................. F24J 3/02
[52] U.S. Cl. .................................... 126/450; 126/446; 126/444; 126/445; 126/449
[58] Field of Search ................ 126/450, 444, 445, 446, 126/449, 417

[56] References Cited

U.S. PATENT DOCUMENTS

| | | | |
|---|---|---|---|
| Re. 30,136 | 11/1979 | Schriefer, Jr. | 126/450 |
| 4,068,652 | 1/1978 | Worthington . | |
| 4,098,260 | 7/1978 | Goettl | 126/429 X |
| 4,108,155 | 8/1978 | Koizumi et al. . | |
| 4,114,593 | 9/1978 | Guertin | 126/450 X |
| 4,141,339 | 2/1979 | Weinstein | 126/450 |
| 4,154,220 | 5/1979 | Loth . | |
| 4,246,888 | 1/1981 | Jarzenbeck, Sr. . | |
| 4,248,212 | 1/1981 | Stevens . | |
| 4,296,741 | 10/1981 | Harder | 126/429 X |
| 4,324,232 | 4/1982 | Quiroz | 126/429 X |

OTHER PUBLICATIONS

"Solar Energy: Fundamentals In Building Design", by Bruce Anderson, pp. 176, 178, 180.
Encyclopedia Britannica, vol. 1, 1965, pp. 207, 208.
HUD; "Intermediate Minimum Property Standards Supplement;" 1977; Solar Heating and Domestic Hot Water Systems, pp. 5-30.

Primary Examiner—Larry Jones
Attorney, Agent, or Firm—Henderson & Sturm

[57] ABSTRACT

A solar collector has an external frame on top of which a collector cover is installed to overlie a collector plate secured to an internal frame which is installed within the external frame. The space between the collector cover and front of the collector plate comprises a first dead air space. The collector is ribbed, having a textured surface, and has a flat black coating applied to both the front and rear surface, thereof. A heat transfer chamber, having fluid communication with a forced airflow, is formed between the rear side of the collector plate and a heat reflective member. The heat reflective member is a rigid thermally insulating material having a heat reflective upper surface. The sides of the heat transfer chamber are bounded by the internal frame which is constructed from a rigid, thermally insulating material, and all seams of the chamber are caulked to provide an air tight chamber. A second dead air chamber is provided below the heat transfer chamber between the rear side of the reflective member and a backing member for the frame. An airflow is forced through the heat transfer chamber to carry away the heat trapped therein. The chamber is designed to induce turbulent, as opposed to laminar, airflow. The aforementioned ribbed and textured design of the collector plate breaks down laminar flow, as do baffles which are installed within the heat transfer chamber to introduce turbulence.

1 Claim, 5 Drawing Figures

U.S. Patent
Oct. 4, 1983
4,407,270
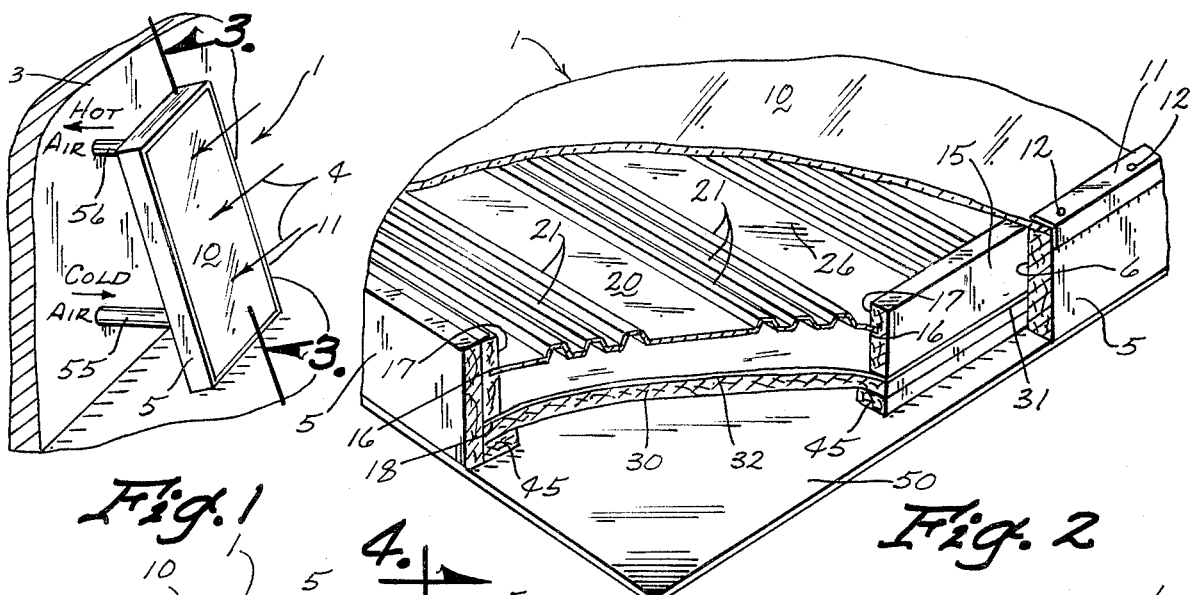
Fig. 1
Fig. 2
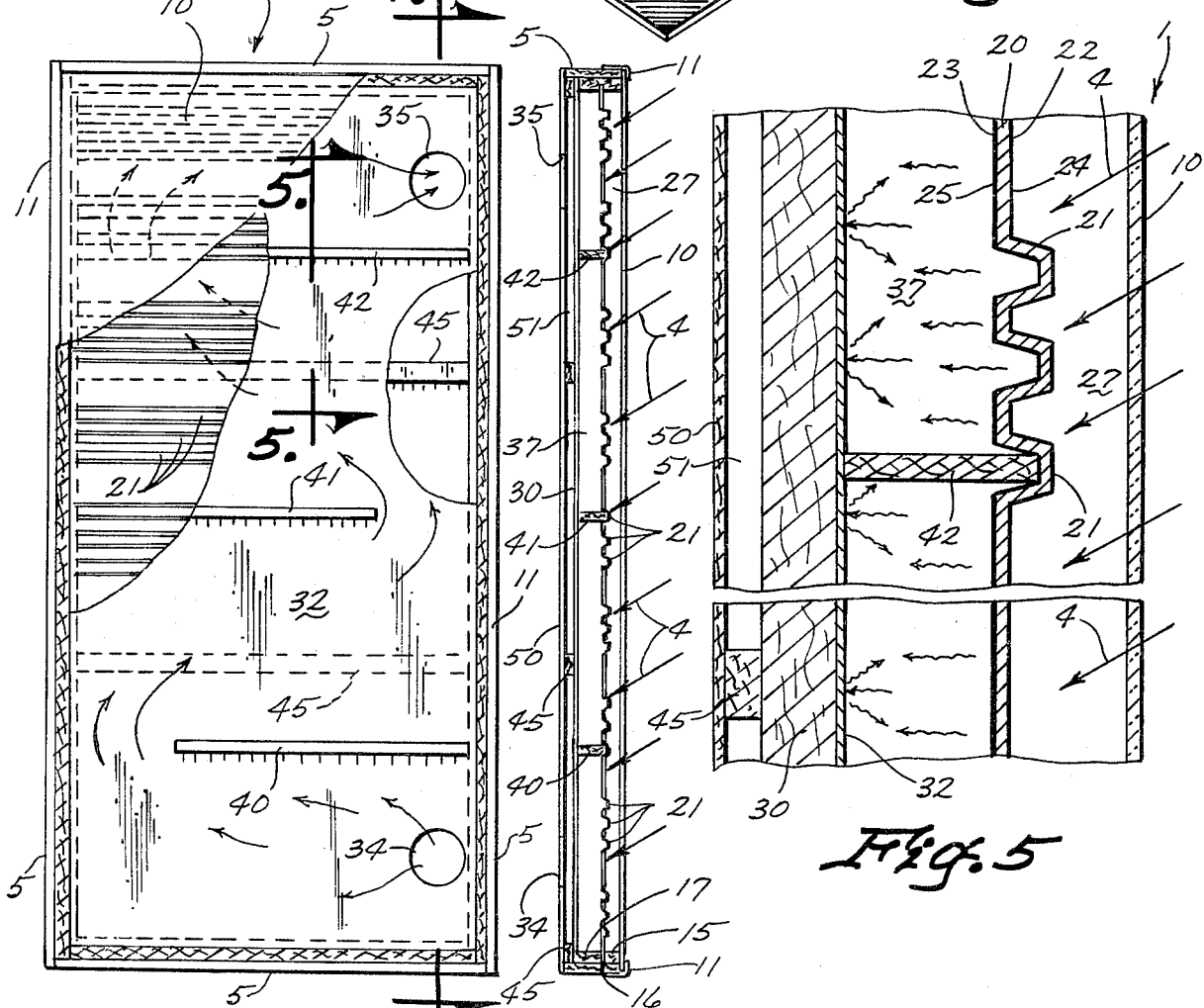
Fig. 3
Fig. 4
Fig. 5

SOLAR COLLECTOR

BACKGROUND OF THE INVENTION

The present invention relates to solar collectors and more particularly, to those used primarily for space heating purposes.

Some collectors of the prior art are shown in U.S. Pat. Nos. 4,068,652; 4,246,888; 4,108,155; 4,248,212; and 4,154,220. As a review of these patents demonstrates, such solar collectors typically include a dark, or black, collector which is heated by the sun, and cooled either by a network of fluid heat exchange pipes circulating a coolant within the collector, or by an airflow directed over the top of the collector. The efficiency of each prior art device varies with its particular structure, but none are highly efficient. In addition to being somewhat inefficient to varying degrees, the prior art structures are complicated in design, and accordingly, expensive in construction, as well as typically being large and heavy, and therefore, a substantial undertaking to construct and install.

Hence, there is a long standing need for a more efficient solar collector, which is lightweight, inexpensive in construction, and easy to install. This need is especially great in view of the present energy shortage, and the expense normally involved in installing available collectors into existing homes or buildings.

SUMMARY OF THE INVENTION

The present invention overcomes these various shortcomings of the prior art by providing a highly efficient collector structure, truly novel in design, as well as being lightweight in construction, and uncomplicated in design and installation.

The instant solar collector assembly includes three chambers, each sealed from the other. A central heat transfer chamber located underneath the collector plate, is sandwiched between a first dead air chamber overlying the collector plate, and a second dead air chamber underlying the heat transfer chamber. These overlying and underlying dead air space chambers serve to thermally insulate the heat transfer chamber. The heat transfer chamber, moreover, is formed between the overlying heat emitting collector plate and an underlying heat reflective member, and is bounded on all sides by the thermally insulating material of an internal frame so that it effectively traps all heat transmitted by the collector. The heat trapped in the heat transfer chamber is carried out of the chamber by means of a forced airflow. Means are included within the chamber to introduce turbulence into the airflow and thereby breakdown laminar flow to improve the heat transfer characteristics of the chamber.

It is therefore an object of the present invention to provide an improved solar collector.

It is another object of the present invention to provide a solar collector having a heat transfer chamber bounded by a thermally insulating internal frame which supports the collector plate.

Yet another object is to provide a solar collector which has means for inducing turbulent, nonlaminar airflow through the heat transfer chamber.

Still another object is to provide a highly efficient solar collector employing a truly unique engineering design and concept.

A still further object is to provide a solar collector structure which is highly efficient, while being lightweight and uncomplicated in design and operation, and accordingly, simple and inexpensive to construct and install.

These and other objects, advantages and novel features of the present invention will become apparent from the following detailed description of the invention taken in conjunction with the accompanying drawings.

BRIEF DESCRIPTION OF THE DRAWINGS

FIG. 1 shows a perspective view of the present invention.

FIG. 2 shows a partial perspective view of the present invention with portions broken away to reveal internal details.

FIG. 3 shows a plan view taken along line 3—3 of FIG. 1 with portions broken away.

FIG. 4 shows an elevation in cross section taken along line 4—4 of FIG. 3.

FIG. 5 is an enlarged detail view taken along line 5—5 of FIG. 3.

DESCRIPTION OF THE PREFERRED EMBODIMENT

The solar collector 1 of the present invention is shown installed along the southern exposure of a residential or commercial building 3 in FIG. 1. While the invention is disclosed in the preferred embodiment as a space heater, it could, of course, have other applications.

Referring to FIG. 2, the collector 1 includes an exterior frame 5 which houses or secures the various components of the present invention into a collector assembly 1 as follows:

A transparent collector cover 10, preferably of a reinforced fiberglass material, is installed across the top of frame 5 and secured around the edges of frame 5 by strips of angle bracket 11 and suitable fasteners 12 as shown.

Directly below collector cover 10, and flush with the interior sides 6 of frame 5, an internal frame 15 is installed. Frame 15 is constructed from a rigid, thermally insulating material such as "THERMAX." Internal frame 15 has a groove 16 formed along its interior surface 17. The frame 15 supports the collector plate 20 by means of this groove 16 in that the peripheral edges of the collector plate 20 are frictionally received within the accomodating groove 16 as shown. Collector plate 20 includes, ribs, or corrugations 21, running horizontally across its width serving a purpose later described. Accordingly, groove 16 is so formed as to follow the contour of these corrugations 21, and this, ensure an air tight fit between the interior frame 15 and the collector plate 20. With reference to FIG. 5, collector plate 20 has a front surface 22 and a rear surface 23, both of which surfaces are textured. These surfaces 22, 23 have, respectively, a front surface coating 24, and rear surface coating 25 (later described). The space between collector plate 20 and collector cover 10 comprises an insulating dead air space 27 for heat transfer chamber 37 (later described).

Interior frame 15, supporting collector plate 20 as described, is in turn supported along its bottom edges 18 by a reflecting member 30. The edges 18 are suitably secured to member 30 to provide an air tight seal between frame 15 and member 30. Reflecting member 30 is suitably dimensioned so that its outer edges 31 are installed flush against the interior sides 6 of exterior frame 5. The member 30 is constructed of a rigid insulating material and has a reflecting surface 32 installed across its entire upper surface. Reflecting member 30 has a rear surface 33, and includes an air inlet port 34 and air outlet point 35 formed at opposite ends as shown (later described). The space confined between collector 20 and reflecting member 30 comprises the heat transfer chamber 37.

Reflecting member 30 supports a first baffle 40, second baffle 41, and third baffle 42. The upper ends of each of the baffles 40, 41, 42 are secured within a rib 21 of collector plate 20 as shown in FIG. 5. With reference to FIG. 3, it is noted that none of the baffles 40, 41, or 42 extends completely across the width of heat transfer chamber 37; but rather, the baffles extend only partially across the chamber 37. These baffles 40, 41 and 42 produce a circutious, or serpentine, airflow in chamber 37 to maximize heat transfer as will later be more fully described.

Reflecting member 30, supporting interior frame 15 and baffles 40, 41, 42, as described, is in turn supported about its peripheral edges by base members 45 which are mounted flush along the interior of the sides of frame 5. Base members 45 are, in turn, supported by backing member 50 which is secured across the back of the frame 5 by any suitable means to complete the collector assembly 1. The space between backing 50 and reflecting member 30 comprises a second dead air space 51 which serves to insulate the heat transfer chamber 37 on the back side. Hence, chamber 37 is sandwiched between and insulated by dead air spaces 27 and 51. Backing 50 includes suitable openings (not shown) to snugly accomodate an air inlet conduit 55 and outlet conduit 56 shown in FIG. 1. The conduits 55, 56 extend from the interior of the house 3, through the openings of backing 50, to the inlet port 34 and outlet port 35, respectively, of reflecting member 30. The ends of conduits 55, 56 form an air tight seal with the respective ports 34, 35 by any suitable means. Conduits 55, 56 should be insulated. A fan (not shown) is in line with the inlet conduit 55 to force air through the collector assembly 1.

Having described the basic structure of the collector assembly 1 of the present invention, its operation will now be described.

With reference to FIG. 1, sun rays 4 impinge upon the collector cover 10 and pass through it to impinge upon the collector plate 20. The space enclosed between the collector plate 20 and collector cover 10 comprises a dead air space 27 which insulates the plate 20 and allows it to become heated upon absorption of the light rays. The front surface coating 24 of the plate 20 is flat black, or any suitable coating, to best absorb, rather than reflect, the solar rays. As the collector plate 20 heats due to the exposure to solar rays described, the heat energy is conducted through the plate 20 to the rear surface 23. Conductor plate 20 is constructed of a material having good heat conductivity to increase efficiency. The rear surface coating is a nonselective coating such as a flat black paint. This nonselective coating emits heat energy nearly equal to the light energy absorbed by the front surface coating 24. Providing this nonselective, flat black coating on the rear surface 25 enhances heat emission of the rear side of a collector. The heat from this rear surface coating 25 is emitted into heat transfer chamber 37. The heat reflective surface 32, at the opposite side of heat transfer chamber 37, reflects, rather than absorbs, the heat energy emitted into chamber 37 by the surface 25, and thus, heat energy is trapped in heat transfer chamber 37. The heat reflective surface 32 can comprise a shiny metallic material, for example. The amount of heat retained in chamber 37 is further increased by the fact that walls 17 of the chamber 37, as well as the reflecting member 30, are constructed from the rigid, thermally insulating material of internal frame 15. Moreover, all seams of the chamber 37 can be sealed by a suitable caulking material to produce an air tight chamber. The ribs 21 of collector 20, furthermore, provide greater surface area for heat absorption and radiation which still further increases the heat energy of chamber 37.

The heat chamber conducted into and trapped by chamber 37, as described, is carried out of the chamber 37 by a uniquely designed airflow system to maximize heat transfer.

A fan (not shown) forces air through the inlet conduit 55 and out of the inlet port 34 into chamber 37. The air flowing in through inlet 34 sequentially circumvents baffles 40, 41, 42 before exiting through outlet port 35 to produce a serpentine airflow through the chamber 37.

Various means are employed to produce a nonlaminar airflow through chamber 37 to maximize heat transfer. That is, during laminar airflow conditions, the air layers moving closest to the surfaces of the chamber 37 would move slowest, due to their frictional contact with the chamber surfaces. These slow moving surface layers of airflow produce an insulating layer of still, or slow moving, air about the surfaces of the chamber 37 reducing the amount of heat energy entering the chamber 37. The present invention, accordingly, employs various means to prevent such laminar flow.

First, the baffles 40, 41 and 42 force the air to flow in a circuitous, or serpentine, pattern which encourages turbulence in the airflow. These baffles 40, 41, 42, moreover, are unevenly spaced along chamber 37 to produce pressure differentials within the chamber 37 further encouraging turbulent airflow. In addition, the corrugations, or ribs, 21 and textured surface 23 of collector plate 20 further assists in introducing turbulence and breaking down laminar airflow. In order to best take advantage of these various turbulence inducing means, it is important that the distance between the collector plate 20 and reflecting member 30 not be too great. The inventor herein has, accordingly, found that a spacing in the range of $1\frac{1}{2}''$ to $2\frac{3}{4}''$ between the surface 32 of member 30 and the flat, uncorrugated, portion of the surface 23 of plate 20 is optimum.

By employing these various means for introducing turbulence and breaking down laminar airflow, the heat transfer efficiency of chamber 37 is increased. Providing these turbulence inducing means in combination with the heat emittive surface 23 and heat reflective surface 32 of the insulated heat transfer chamber 37, moreover, greatly increases the amount of heat transferable from the chamber 37 into a commercial building, or house, 3 for space heating purposes.

Having disclosed the preferred embodiment of the present invention, it is intended to be understood that various modifications obvious to one skilled in the art could be made in view of its teachings. The invention, therefore, may be practiced otherwise than as specifically described, and is to be limited only by the scope of the appended claims.

I claim:

1. A solar collector, comprising:
   a. an external frame;

b. an internal frame installed within said external frame, said internal frame being constructed from a rigid, thermally insulating material;

c. an opaque collector plate means for preventing light rays from passing therethrough frictionally received within a groove formed on the inside surface of the internal frame, said collector plate having corrugations and said rear surface of said collector plate including textured surface means for helping to cause non-laminar flow of air through said heat transfer chamber;

d. an insulated reflective means installed within said external frame below said collector plate in a spaced apart relationship for receiving heat energy rays from said collector plate for reflecting said heat energy rays back toward said collector plate;

e. a translucent collector cover secured to said external frame above said collector plate in a spaced apart relationship with regard thereto;

f. a heat transfer means including a chamber formed between said collector plate and said reflective member and bounded by said thermally insulating internal frame, said heat transfer chamber being between 1½ inches and 2¾ inches in width, for helping to cause non-laminar flow of air through said heat transfer chamber and wherein the rear surface of said collector plate has a heat emittive, non-selective coating thereon, and said heat transfer chamber is formed between said rear surface and a reflective surface provided on said reflecting means whereby said non-selective coating will readily release heat energy to the air in said heat transfer chamber;

g. a heat transfer means for transferring heat from said heat transfer chamber, said heat transfer means comprising means for creating airflow through said heat transfer chamber, said heat transfer chamber having an air inlet and an air outlet and a means for forcing air through said heat transfer chamber from said inlet to said outlet;

h. a plurality of baffles disposed in said heat transfer chamber for directing said airflow in a circuitous path from said inlet to said outlet;

i. uneven baffle spacing means for helping to cause non-laminar flow of air through said heat transfer chamber wherein said baffles are unevenly spaced along said heat transfer chamber; and j. a first dead air space between said collector plate and said collector cover, and a second dead air space means, including a backing member secured to the rear of said external frame in a spaced apart relationship with respect to said reflective member, for forming a second dead air space between said backing member and the rear side of said reflective member, wherein said exterior frame encloses said first and second dead air spaces and said heat transfer chamber, whereby said heat transfer chamber is sandwiched between first and second dead air spaces.

* * * * *